US012565940B2

(12) United States Patent
Fan

(10) Patent No.: US 12,565,940 B2
(45) Date of Patent: Mar. 3, 2026

(54) VALVE WITH CAPABILITY TO SELF-ANTICIPATE FAILURE

(71) Applicant: Kuqi Investment Co., Ltd., Taoyuan City (TW)

(72) Inventor: Yi-Ming Fan, Taoyuan City (TW)

(73) Assignee: KUQI INVESTMENT CO., LTD., Taoyuan City (TW)

( * ) Notice: Subject to any disclaimer, the term of this patent is extended or adjusted under 35 U.S.C. 154(b) by 1133 days.

(21) Appl. No.: 17/535,795

(22) Filed: Nov. 26, 2021

(65) Prior Publication Data

US 2022/0178468 A1    Jun. 9, 2022

Related U.S. Application Data

(60) Provisional application No. 63/120,920, filed on Dec. 3, 2020.

(30) Foreign Application Priority Data

Oct. 22, 2021    (CN) .......................... 202111235874.1

(51) Int. Cl.
*F16K 37/00*        (2006.01)
*F16K 31/42*        (2006.01)

(52) U.S. Cl.
CPC .......... *F16K 37/0083* (2013.01); *F16K 31/42* (2013.01); *F16K 31/423* (2013.01); *F16K 31/426* (2013.01); *F16K 37/005* (2013.01)

(58) Field of Classification Search
CPC ...... F16K 31/42; F16K 31/423; F16K 31/426; F16K 31/1635; F16K 37/0083; F16K 37/0041; F16K 37/005
See application file for complete search history.

(56) References Cited

U.S. PATENT DOCUMENTS

| | | | | |
|---|---|---|---|---|
| 2010/0152908 | A1* | 6/2010 | Meier ................. | F16K 37/0041 |
| | | | | 700/282 |
| 2019/0331143 | A1* | 10/2019 | Penning ................ | F15B 19/005 |
| 2019/0368631 | A1* | 12/2019 | Barth ................. | G05B 23/0235 |

(Continued)

*Primary Examiner* — Atif H Chaudry
(74) *Attorney, Agent, or Firm* — MUNCY, GEISSLER, OLDS & LOWE, P.C.

(57) ABSTRACT

A valve with capability to self-anticipate failure has a body which is provided with at least one sensor assembly and a controller. The sensor assembly outputs a plurality of time-dependent sensing signals of a first operation parameter of the spindle of the valve or a plurality of time-dependent sensing signals of a second operation parameter of the valve door of the valve. The controller includes a storage unit, a computation unit, and an informing unit. The computation unit computes out a first trendline of the last plurality of time-dependent sensing signals of the first operation parameter stored in the storage unit or a second trendline of the last plurality of the time-dependent sensing signals of the second operation parameter stored in the storage unit. The computation unit also computes out a first accumulated-time threshold of the valve corresponding to a threshold of the first operation parameter over the first trendline or a second accumulated-time threshold of the valve corresponding to a threshold of the second operation parameter over the second trendline. The informing unit outputs the first or the second accumulated-time threshold to the remote of the valve.

16 Claims, 6 Drawing Sheets

(56) References Cited

U.S. PATENT DOCUMENTS

| | | | |
|---|---|---|---|
| 2020/0088315 A1* | 3/2020 | Anderson | ........... F16K 37/0041 |
| 2020/0182377 A1* | 6/2020 | Brown | .................. F16K 31/042 |
| 2022/0333714 A1* | 10/2022 | Friman | ................. F15B 19/005 |

* cited by examiner

VALVE WITH CAPABILITY TO SELF-ANTICIPATE FAILURE

CROSS REFERENCE TO RELATED APPLICATIONS

This application claims priority of U.S. Provisional Application No. 63/120,920 filed on Dec. 3, 2020 under 35 U.S.C. § 119(e,; and this application claims priority of application Ser. No. 202111235874.1 filed in China on Oct. 22, 2021 under 35 U.S.C. § 119, the entire contents of which are hereby incorporated by reference.

TECHNICAL FIELD

The present invention relates to a valve, especially relates to a valve with capability to self-anticipate failure.

BACKGROUND

Valve control can be classified into remote control and proximal control. The remote control uses a control-center located far away from the valve to perform valve actuation and pressure adjustment control and is currently the main control method in the technical field. The proximal control uses the controller in direct connection with the actuator of the valve to directly control the actuator and indirectly control the operation of the valve. However, either in case of remote control or proximal control, when a valve is failed and cannot be repaired immediately and needs to be replaced, it would be required to stop the operation of the entire system including the valve and all the other parts, which will cause the shutdown of the entire process or production line using the valve and is not in line with economic benefits.

With the development of science and technology, valve control should be more intelligent. Without the assistance of the remote control-center, whether the valve itself may be able to self-anticipate its failure so that the valve operator or the remote control-center can earlier get the possible failure time of the valve and then make a response in advance to avoid late discovering the valve failure. This application aims to solve this technical problem.

Therefore, a valve with capability to self-anticipate failure is herein proposed.

SUMMARY

In view of the above problems, the present invention proposes a valve with capability to self-anticipate failure to realize instant failure self-anticipation and operation self-control of the valve by means of various signals of a plurality of operation parameters obtained through sensing during the operation of the valve. The failure self-anticipation and operation self-control of the valve do not require the assistance of a remote control-center. The proposed valve is able to transmit in real time the self-anticipated failure time threshold or the stop-from-using time target of the valve to the remote control-center and/or the valve operator before the valve is about to fail or break down, which facilitates earlier replacement of the valve before its failure.

In one embodiment, the proposed valve includes at least a body, a valve door, a spindle, an actuator, a controller, and a first sensor assembly. The valve door is mounted in a hollow chamber formed in the body to open and close the hollow chamber. The spindle is inserted into the body and connected with the valve door to rotate with the valve door.

The actuator is mounted on the body to drive the spindle to rotate. The first sensor assembly has sensors mounted on the spindle, the valve door, the body, or a pipeline connecting the body to output time-dependent sensing signals of a first operation parameter of the spindle, a second operation parameter of the valve door, a third operation parameter of the body, or a fourth operation parameter of the pipeline during each stroke from opening to closing of the valve door. The controller is disposed near the body and electrically connected with or in telecommunication with the actuator and the first sensor assembly and has a storage unit, a computation unit, and an informing unit. The storage unit is used to receive and store the time-dependent sensing signal of one of the first, second, third, and fourth operation parameters, or to receive and store computed time-dependent values of a synergistic operation parameter representing comprehensive effects of the first, second, third, and fourth operation parameters, wherein each of the computed time-dependent values of the synergistic operation parameter is a sum of respective products of the corresponding time-dependent sensing signal of the first, second, third, and fourth operation parameters and a plurality of corresponding weighting values. The computation unit is in electrical connection with the storage unit to compute out a first trendline of the last plurality of the stored time-dependent sensing signals of the first operation parameter, a second trendline of the last plurality of the stored time-dependent sensing signals of the second operation parameter, a third trendline of the last plurality of the stored time-dependent sensing signals of the third operation parameter, a fourth trendline of the last plurality of the stored time-dependent sensing signals of the fourth operation parameter, or a synergistic trendline of the last plurality of the stored computed time-dependent values of the synergistic operation parameter, and to compute out a first accumulated-time threshold of the valve corresponding to a threshold of the first operation parameter over the first trendline, a second accumulated-time threshold of the valve corresponding to a threshold of the second operation parameter over the second trendline, a third accumulated-time threshold of the valve corresponding to a threshold of the third operation parameter over the third trendline, a fourth accumulated-time threshold of the valve corresponding to a threshold of the fourth operation parameter over the fourth trendline, or a synergistic accumulated-time threshold of the valve corresponding to a threshold of the synergistic operation parameter over the synergistic trendline. The informing unit is in electrical connection with the computation unit to output one of the first accumulated-time threshold, the second accumulated-time threshold, the third accumulated-time threshold, the fourth accumulated-time threshold, and the synergistic accumulated-time threshold.

In one embodiment, the proposed valve further includes a pressure regulating device connected to the actuator to regulate an inlet pressure of the actuator.

In one embodiment, the controller further includes a control unit in electrical connection with the computation unit to regulate the inlet pressure of the actuator according to a variance between each of the time-dependent sensing signals of the first operation parameter and the threshold of the first operation parameter or between each of the time-dependent sensing signals of the second operation parameter and the threshold of the second operation parameter, and the storage unit is further used to store the variance.

In one embodiment, the computation unit is further used to compute out a first accumulated-time target value of the valve corresponding to a setting limit of the first operation parameter over the first trendline, a second accumulated-time target value of the valve corresponding to a setting limit of the second operation parameter over the second trendline, a third accumulated-time target value of the valve corresponding to a setting limit of the third operation parameter over the third trendline, a fourth accumulated-time target value of the valve corresponding to a setting limit of the fourth operation parameter over the fourth trendline, or a synergistic accumulated-time target value of the valve corresponding to a setting limit of the synergistic operation parameter over the synergistic trendline; the informing unit is further used to output one of the first accumulated-time target value, the second accumulated-time target value, the third accumulated-time target value, the fourth accumulated-time target value, and the synergistic accumulated-time target value; and the setting limit of the first operation parameter is smaller than the threshold of the first operation parameter, the setting limit of the second operation parameter is smaller than the threshold of the second operation parameter, the setting limit of the third operation parameter is smaller than the threshold of the third operation parameter, the setting limit of the fourth operation parameter is smaller than the threshold of the fourth operation parameter, and the setting limit of the synergistic operation parameter is smaller than the threshold of the synergistic operation parameter.

In one embodiment, the computation unit is further used to determine in real time whether magnitude of the stored time-dependent sensing signals of the first operation parameter exceed the setting limit of the first operation parameter, whether magnitude of the stored time-dependent sensing signals of the second operation parameter exceed the setting limit of the second operation parameter, whether magnitude of the stored time-dependent sensing signals of the third operation parameter exceed the setting limit of the third operation parameter, whether magnitude of the stored time-dependent sensing signals of the fourth operation parameter exceed the setting limit of the fourth operation parameter, or whether magnitude of the stored computed time-dependent values of the synergistic operation parameter exceed the setting limit of the synergistic operation parameter.

In one embodiment, the first operation parameter is the torsion of the spindle, and the threshold of the first operation parameter includes a maximum output torque of the actuator.

In one embodiment, the first sensor assembly is further used to output position-dependent sensing signals of the torsion of the spindle which vary with the position of the valve door during each stroke from opening to closing of the valve door; the storage unit is further used to receive and store the position-dependent sensing signals of the torsion of the spindle; and the computation unit is further used to determine whether magnitude of the stored position-dependent sensing signals of the torsion of the spindle exceed a setting torsion limit of the spindle.

In one embodiment, the informing unit is further used to output failure causing reasons of the valve according to the determination of the computation unit.

In one embodiment, the first operation parameter is the axial stress of the spindle, and the threshold of the first operation parameter includes an allowable stress of the spindle.

In one embodiment, the computation unit is further used to calibrate the allowable stress of the spindle according to the variation of yield strength of the spindle as the temperature of the spindle changes, and the storage unit is further used to receive and store the yield strength of the spindle that varies with the temperature.

In one embodiment, the computation unit is further used to determine whether magnitude of the stored time-sensing signals of the axial stress of the spindle exceed a setting stress limit of the spindle that is smaller than the allowable stress of the spindle.

In one embodiment, the proposed valve further includes a second sensor assembly having sensors mounted on the actuator and electrically connected or in telecommunication with the controller to output time-dependent sensing signals of a fifth operation parameter of the actuator during each stroke from opening to closing of the valve door. The storage unit is further used to receive and store the time-dependent sensing signals of the fifth operation parameter; the computation unit is further used to compute out a fifth trendline of the last plurality of the stored time-dependent sensing signals of the fifth operation parameter, and to compute out a fifth accumulated-time threshold of the valve corresponding to a threshold of the fifth operation parameter over the fifth trendline; the fifth operation parameter includes the torsion of the actuator or the working air pressure of the actuator; and the informing unit is further used to output the fifth accumulated-time threshold.

In one embodiment, the informing unit is further used to output failure causing reasons of the valve.

In one embodiment, one of the first accumulated-time threshold, the second accumulated-time threshold, the third accumulated-time threshold, the fourth accumulated-time threshold, and the synergistic accumulated-time threshold is represented by accumulated stroke counts of the valve door.

In one embodiment, a valve driving actuator with capability to self-anticipate failure is proposed. The actuator has an actuator body and a power output shaft penetrating the actuator body. The power output shaft has one end to receive a rotatable spindle of a valve to be driven by the actuator. The actuator includes a sensor assembly and a controller. The sensor assembly has at least one sensor mounted on the actuator body or the power output shaft to output time-dependent sensing signals of at least one operation parameter of the actuator. The controller is disposed near the actuator body and electrically connected or in telecommunication with the sensor assembly. The controller has a storage unit, a computation unit, and an informing unit. The storage unit is used to receive and store the time-dependent sensing signals of the operation parameter of the actuator. The computation unit is in electrical connection with the storage unit to compute out a trendline of the last plurality of the stored time-dependent sensing signals of the operation parameter, and to compute out an accumulated-time threshold of the actuator corresponding to a threshold of the operation parameter over the trendline. The informing unit is in electrical connection with the computation unit to output the accumulated-time threshold. Furthermore, the operation parameter includes torsion of the power output shaft or working air pressure of the actuator, and the working air pressure is associated with an inlet pressure and an exhaust pressure of the actuator.

In one embodiment, the actuator is a pneumatic actuator, the sensor assembly has a sensor to output sensing signals of the exhaust pressure of the actuator, the computation unit is further used to determine whether a change of the exhaust pressure is normal, and the informing unit is further used to output reasons causing failure of the actuator according to the result of the determination of the computation unit.

In one embodiment, the actuator further includes a pressure regulating device connected to the actuator body to be used to regulate the inlet pressure of the actuator.

In one embodiment, the controller further has a control unit in electrical connection with the computation unit to regulate the inlet pressure of the actuator according to a variance between each of the time-dependent sensing signals of the operation parameter of the actuator and the threshold of the operation parameter, and the storage unit is further used to store the variance.

In one embodiment, the accumulated-time threshold is represented by an accumulated rotation counts or an accumulated rotation time of the power output shaft.

In all of the embodiments, the first operation parameter may be the axial stress or the torsion of the spindle; the second operation parameter may be time interval required for the valve door to travel from opening to closing of the chamber in each stroke, speed of the valve door to travel from opening to closing of the chamber in each stroke, time interval required for the valve door to close up the chamber in each stroke, or speed of the valve door to close up the chamber in each stroke. The third operation parameter may be fluid leakage in the body of the valve in each stroke of the valve door. The fourth operation parameter may be pressure at the connection of the pipeline and the body of the valve during closing of the chamber in each stroke of the valve door.

To sum up, the proposed valve has the capability to self-anticipate failure and meets the actual control requirements of the entire system including the valve. The proposed solution specifically improves the performance of the existing valve which is not able to accomplish and announce the failure self-anticipation. The proposed valve uses the computation unit in the controller to compute out the predicted time point when the valve will fail after being used for a period of time and notify the operator away from the valve or the remote control-center in advance. As a result, the valve that is about to fail can be replaced earlier to prevent the failure of the valve from affecting the operation of the entire system including the valve.

In order to make the above-mentioned features and advantages of the present invention more obvious and easier to understand, the following specific embodiments are described in detail in conjunction with the accompanying drawings.

BRIEF DESCRIPTION OF DRAWINGS

The following detailed descriptions, given by way of example, and not intended to limit the present invention solely thereto, will be best be understood in conjunction with the accompanying figures.

DETAILED DESCRIPTION OF THE EMBODIMENTS

The present invention discloses a valve with capability to self-anticipate failure. The parts of the following descriptions which are believed to be already understood by those skilled in the art, such as the basic operating principle of the valve, will not be fully described. In addition, if the meaning of the technical terms described in the following text is different from the usual meaning of these terms in the technical field, the meaning in the text shall prevail. The referred figures in the text are used to express the meaning related to the features as described and are not drawn according to the actual size.

Figures 1, 2:
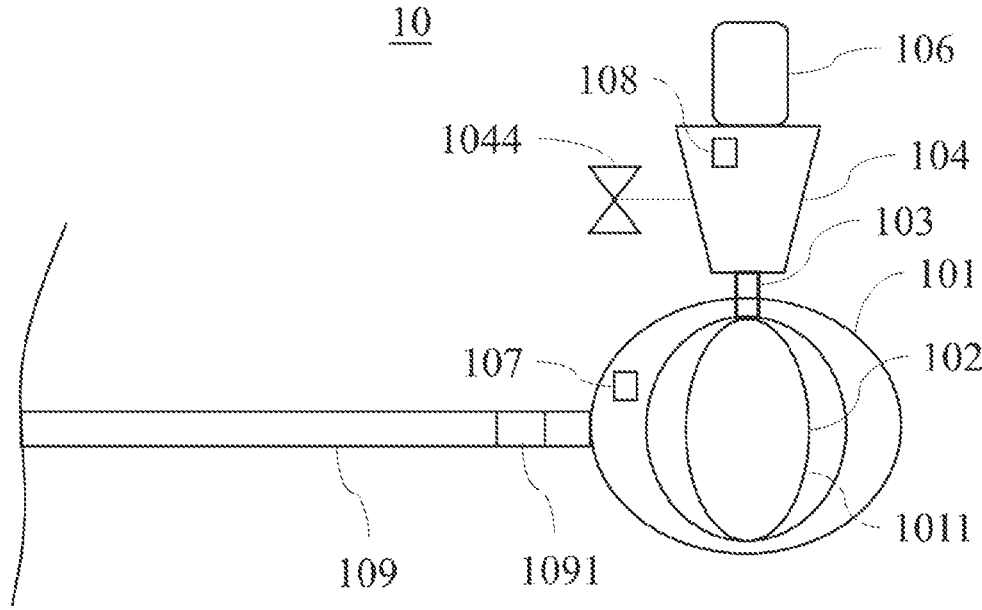
FIG. 1 is a plane view schematically illustrating a valve with capability to self-anticipate failure according to one embodiment of the present invention.
FIG. 2 is a functional block view schematically illustrating the controller of the valve in FIG. 1 according to one embodiment of the present invention.

Referring to FIG. 1 and FIG. 2, in one embodiment, a valve 10 includes a body 101, a valve door 102, a spindle 103, an actuator 104, a controller 106, and a first sensor assembly 107. The controller 106 has a storage unit 1061, a computation unit 1062, an informing unit 1063, and a control unit 1064. The storage unit 1061, the informing unit 1063, and the control unit 1064 are all electrically connected to the computation unit 1062. The controller 106 is an electronic system including a processor, which may be in IC type, and other supporting electronic components. In one embodiment, the controller 106 may be a micro processing unit (MCU). The valve door 102 is mounted in a hollow chamber 1011 formed in the body 101 to open and close the chamber 1011 to control the fluid flow through the hollow chamber 1011. The valve door 102 may be a disk of a butterfly valve or a ball of a ball valve. The spindle 103 is inserted in the body 101 and connected with the valve door 102 to rotate with the valve door 102. The actuator 104 is mounted on the body 101 and connected to the spindle 103 and can be an electric or pneumatic or hydraulic power output device for driving the spindle 103 to rotate. In addition, the valve 10 may further include a pressure regulating device 1044 connected to the actuator 104 for regulating an inlet pressure of the actuator 104. The first sensor assembly 107 has one sensor or a plurality of sensors mounted on the body 101, the valve door 102, the spindle 103, or a pipeline 109 connected to the body 101.

Referring to FIG. 1 to FIG. 4, in one embodiment, the first sensor assembly 107 includes a sensor mounted on the spindle 103 to output time-dependent sensing signals SA1 (black points in FIG. 3) of a first operation parameter A1 of or in relevant to the spindle 103 during each stroke from opening to closing of the valve door 102. Alternatively, the first sensor assembly 107 includes a sensor mounted on the valve door 102 to output time-dependent sensing signals SA2 (black points in FIG. 4) of a second operation parameter A2 of or in relevant to the valve door 102 during each stroke from opening to closing of the valve door 102. The so-called each stroke from opening to closing of the valve door 102 means each travel route of valve door 102 from completely opening to completely closing the chamber 1011. In usual cases, regarding a valve traveling in rotational route, the position of the valve door 102 to completely open the chamber 1011 is where the axial centerline of the valve door 102 intersects the axial centerline of the chamber 1011 at 90 degrees, while the position of the valve door 102 to completely close the chamber 1011 is where the axial centerline of the valve door 102 is parallel or coincident with the axial centerline of the chamber 1011. When failure of the valve 10 is associated with the axial stress or the torsion of the spindle 103, the first operation parameter A1 may be the axial stress or the torsion of the spindle 103 and the first sensor assembly 107 may include strain sensor (such as strain gage), stress sensor, or torsion sensor. The axial stress means the stress of the spindle 103 in the axial direction of the spindle 103 during each stroke from opening to closing of the valve door 102. The torsion is that applied to the spindle 103 during each stroke from opening to closing of the valve door 102. When failure of the valve 10 is associated with the stroke of the valve door 102, the second operation parameter may include time interval required for the valve door 102 to travel from completely opening to completely closing of the chamber in each stroke, travel speed of the valve door 102 to travel from completely opening to completely closing of the chamber in each stroke, time interval required for the valve door 102 from about to close to completely close the chamber in each stroke, or travel speed of the valve door 102 from about to close to completely close the chamber in each stroke and the first sensor assembly 107 may include timer.

Figure 3:
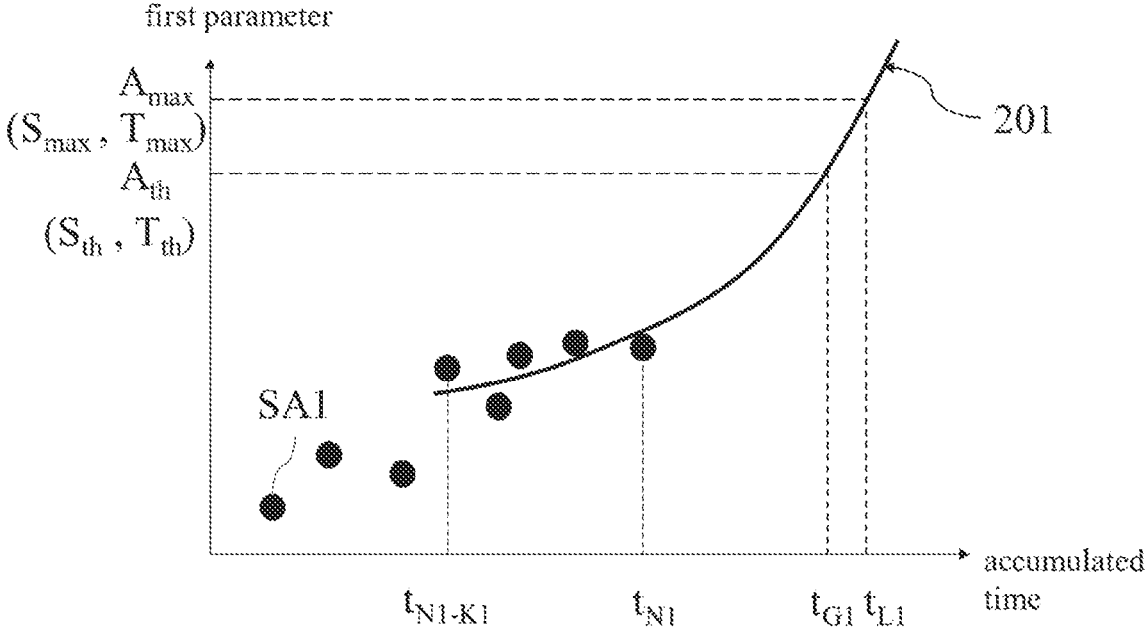
FIG. 3 is a diagram schematically illustrating the relationship between the time-dependent sensing signals of a first operation parameter of the spindle of the valve varying with time during each stroke from opening to closing of the valve door, the first trendline, and the threshold of the first operation parameter according to one embodiment of the present invention.
Figure 4:
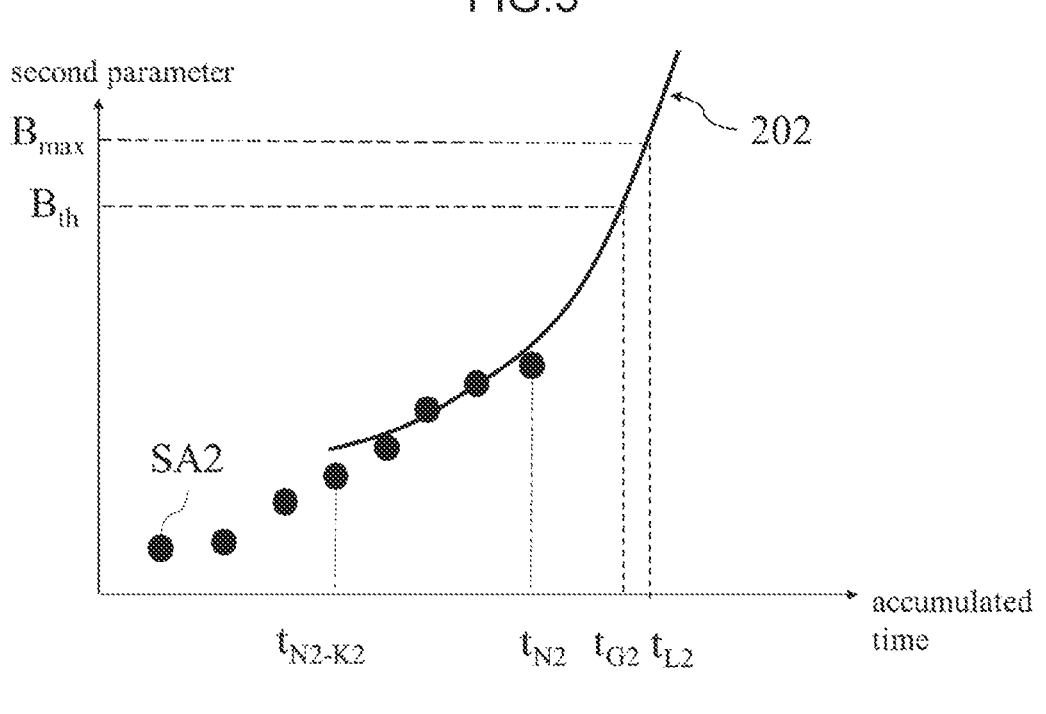
FIG. 4 is a diagram schematically illustrating the relationship between the time-dependent sensing signals of a second operation parameter of the valve door of the valve varying with time during each stroke from opening to closing of the valve door, the second trendline, and the threshold of the second operation parameter according to one embodiment of the present invention.

Referring to FIG. 1 to FIG. 4, in one embodiment, the controller 106 is disposed near the body 101 and electrically connected with or in telecommunication with the actuator 104 and the first sensor assembly 107. The so-called "in telecommunication with" includes wireless communication and wire communication. The controller 106 is used to control the actuator 104, the pressure regulating device 1044, and the first sensor assembly 107. In this way, the controller 106 monitors the valve 10 and notifies the remote control-center of the operation condition of the valve 10. The storage unit 1061 is used to receive and store in real time the time-dependent sensing signals SA1 of the first operation parameter A1 or the time-dependent sensing signals SA2 of the second operation parameter A2. The computation unit 1062 is in electrical connection with the storage unit 1061 to compute out in real time a first trendline 201 (see FIG. 3) of the last plurality of the stored time-dependent sensing signals SA1 of the first operation parameter A1, or a second trendline 202 (see FIG. 4) of the last plurality of the stored time-dependent sensing signals SA2 of the second operation parameter A2. In FIG. 3, the last plurality of the stored time-dependent sensing signals SA1 of the first operation parameter A1 means the time-dependent sensing signals SA1 taken during a time period from $t_{N1\text{-}K1}$ to $t_{N1}$, wherein the time-dependent sensing signal SA1 taken at the accumulated-time $t_{N1}$ is the last signal SA1 that has been stored in the storage unit 1061 while the time-dependent sensing signal SA1 taken at the accumulated-time $t_{N1\text{-}K1}$ is the K1-th signal counted from the last signal SA1, N1 and K1 are integers and K1 is smaller than N1. In one embodiment, N1 is equal to or greater than 30 and K1 is equal to or greater than one. In FIG. 4, the last plurality of the stored time-dependent sensing signals SA2 of the second operation parameter A2 means the time-dependent sensing signals SA2 taken during a time period from $t_{N2\text{-}K2}$ to $t_{N2}$, wherein the time-dependent sensing signal SA2 taken at the accumulated-time $t_{N2}$ is the last signal SA2 that has been stored in the storage unit 1061 while the time-dependent sensing signal SA2 taken at the accumulated-time $t_{N2\text{-}K2}$ is the K2-th signal counted from the last signal SA2, N2 and K2 are integers and K2 is smaller than N2. In one embodiment, N2 is equal to or greater than 30 and K2 is equal to or greater than one. As shown in FIG. 3, the computation unit 1062 not only computes out in real time the first trendline 201 but also computes out in real time a first accumulated-time threshold $t_{L1}$ of the valve 10 corresponding to a threshold $A_{max}$ of the first operation parameter A1 over the first trendline 201. As shown in FIG. 4, the computation unit 1062 not only computes out in real time the second trendline 202 but also computes out in real time a second accumulated-time threshold $t_{L2}$ of the valve 10 corresponding to a threshold $B_{max}$ of the second operation parameter A2 over the second trendline 202. As shown in FIG. 2, the informing unit 1063 is used to output or transmit the first accumulated-time threshold $t_{L1}$ or the second accumulated-time threshold $t_{L2}$ to the remote of the valve 10, such as a remote control-center or a remote operator of the valve 10. The first accumulated-time threshold $t_{L1}$ or the second accumulated-time threshold $t_{L2}$ may be represented by accumulated stroke counts, for example 10000 counts, or accumulated stroke time, for example 50000 hours of the valve door 102. The term "accumulated-time" means that the time in consideration is accumulated. For example, when the valve has been operated for 50 strokes of the valve door and it takes 1 hour to run one stroke, then the accumulated-time for the $50^{th}$ stroke is 50 hrs. The term "accumulated-time threshold" means a threshold of the accumulated-time.

As shown in FIG. 1 to FIG. 4, in one embodiment, the storage unit 1061 is further used to store in real time a variance $|A_{max}-SA1|$ between each of the time-dependent sensing signals SA1 of the first operation parameter A1 and the threshold $A_{max}$ of the first operation parameter A1 or a variance $|B_{max}-SA2|$ between each of the time-dependent sensing signals SA2 of the second operation parameter A2 and the threshold $B_{max}$ of the second operation parameter A2, and the control unit 1064 is used to regulate in real time the inlet pressure of the actuator 104 according to the variance by means of the pressure regulating device 1044. For example, when these variances start to below a setting limit, it may be that the axial stress or the torsion of the spindle 103 or the stroke time of the valve door 102 start to reach a limit, and the valve 10 can itself reduce the inlet pressure of the actuator 104 by means of the control unit 1064 and the pressure regulating device 1044 to avoid the spindle 103 from being damaged.

As shown in FIG. 1 to FIG. 3, in one embodiment, when the first operation parameter A1 is the axial stress of the spindle 103, the threshold $A_{max}$ of the first operation parameter A1 may be an allowable stress $S_{max}$ of the spindle 103. In this case, the computation unit 1062 is further used to calibrate the allowable stress $S_{max}$ of the spindle 103 according to the variation of yield strength of the spindle 103 as the temperature of the spindle 103 changes, and the storage unit 1061 is further used to receive and store the variation of the yield strength of the spindle 103. The temperature change of the spindle 103 is detected by means of a temperature sensor included in the first sensor assembly 107. On the other hand, the computation unit 1062 is further used to determine in real time whether magnitude of the time-sensing signals of the first operation parameter stored in the storage unit 1061 exceed a setting limit $A_{th}$ of the operation parameter A1 that is smaller than the threshold $A_{max}$ of the first operation parameter of the spindle 103. As shown in FIG. 3, the computation unit 1062 is further used to determine in real time whether magnitude of the time-sensing signals of the axial stress of the spindle 103 stored in the storage unit 1061 exceed a setting stress limit $S_{th}$ of the spindle 103 that is smaller than the allowable stress $S_{max}$ of the spindle 103. Furthermore, the computation unit 1062 is further used to compute out in real time a first accumulated-time target value $t_{G1}$ of the valve 10 corresponding to a setting stress $S_{th}$ over the first trendline 201, and the informing unit 1063 is further used to output or transmit the first accumulated-time target value $t_{G1}$ to the remote control-center or operator of the valve 10. In this way, the operation of the valve 10 can be monitored in real time and the disordered valve can be early replaced. On the other hand, when the axial stress of the spindle 103 is smaller than the setting stress $S_{th}$, the spindle 103 is still in a usable state, and the valve 10 may control the pressure regulating device 1044 to properly increase the inlet pressure of the actuator 104 by means of the control unit 1064 in order to keep continuous rotation of the spindle 103 and smooth operation of the valve door 102. When the axial stress of the spindle 103 is greater than the setting stress $S_{th}$ but smaller than the allowable stress $S_{max}$, the spindle 103 may be about to fail, and the valve 10 may control the pressure regulating device 1044 to properly decrease the inlet pressure of the actuator 104 by means of the control unit 1064 in order to protect the spindle 103 from being damaged. The term "accumulated-time target value" means a setting limit value of the accumulated-time.

As shown in FIG. 1 to FIG. 3, in one embodiment, when the first operation parameter A1 is the torsion of the spindle 103, the threshold valve $A_{max}$ of the first operation parameter A1 may be the maximum output torque $T_{max}$ of the actuator 104. In this case, the computation unit 1062 is further used to determine in real time whether magnitude of the stored time-dependent sensing signals of the torsion of the spindle 103 exceed a setting torsion $T_{th}$, of the spindle 103, which is smaller than the maximum output torque $T_{max}$ of the actuator 104. In FIG. 3, the first accumulated-time threshold $t_{L1}$ is accumulated stroke counts of the valve door 102 corresponding to the maximum output torque $T_{max}$ of the actuator 104 over the first trendline 201. Furthermore, as shown in FIG. 3, the computation unit 1062 is further used to compute out in real time a first accumulated-time target value $t_{G1}$ of the valve 10 corresponding to a setting torsion limit $T_{th}$ over the first trendline 201, and the informing unit 1063 further outputs or transmits the first accumulated-time target value $t_{G1}$ to the remote control-center or the operator of the valve 10. In this way, the operation of the valve 10 can be monitored in real time and the disordered valve can be early replaced. When the torsion of the spindle 103 is smaller than the setting torsion limit $T_{th}$, the spindle 103 is still in a usable state, and the valve 10 may control the pressure regulating device 1044 to properly increase the inlet pressure of the actuator 104 by means of the control unit 1064 in order to keep continuous rotation of the spindle 103 and smooth operation of the valve door 102. When the torsion of the spindle 103 is greater than the setting torsion limit $T_{th}$ but smaller than the maximum torque of the actuator 104, the spindle 103 may be about to fail, and the valve 10 may control the pressure regulating device 1044 to properly decrease the inlet pressure of the actuator 104 by means of the control unit 1064 in order to protect the spindle 103 from being damaged.

Figure 5:
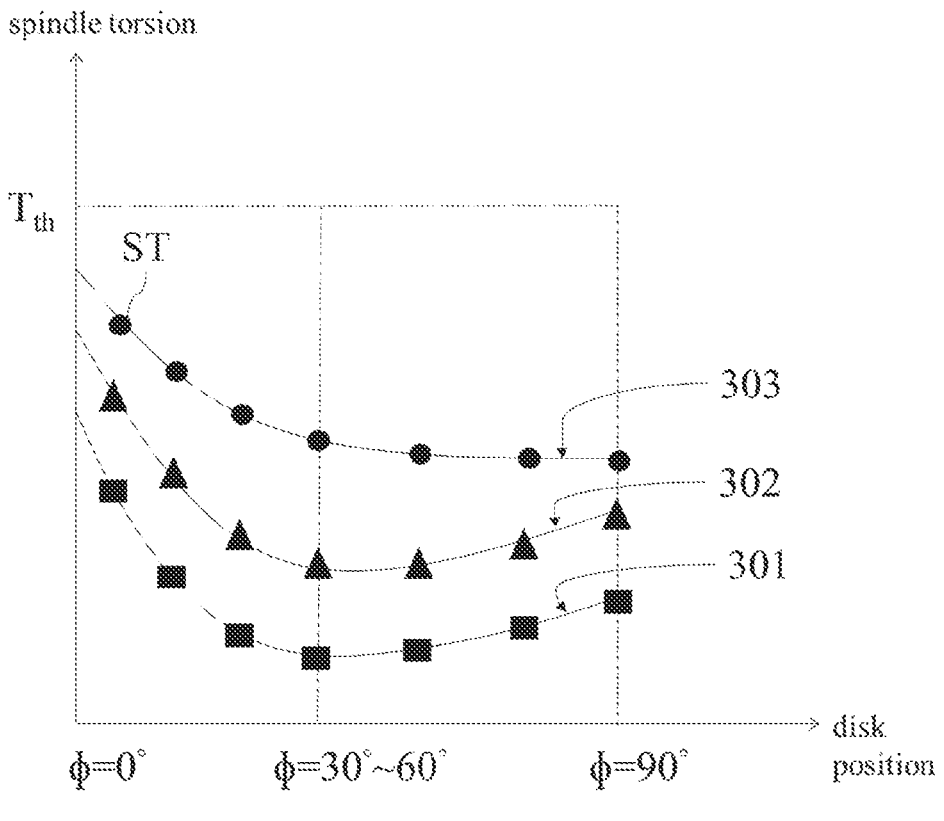
FIG. 5 is a diagram schematically illustrating three curves of position-dependent sensing signals of the torsion of the spindle of the valve varying with position of the valve door during each stroke from opening to closing of the valve door according to one embodiment of the present invention.

As shown in FIG. 1 and FIG. 5, in one embodiment, the first sensor assembly 107 is further used to output position-dependent sensing signals ST of the torsion of the spindle 103 which vary with the position of the valve door 102 during each stroke from opening to closing of the valve door 102. The storage unit 1061 is further used to receive and store in real time the position-dependent sensing signals ST of the torsion of the spindle 103. The computation unit 1062 is further used to determine in real time whether magnitude of the stored position-dependent sensing signals ST of the torsion of the spindle 103 exceed a setting torsion limit of the spindle. In this case, the first sensor assembly 107 may have a position sensor in addition to a torsion sensor or a strain sensor. The position sensor is used to detect the position of the valve door 102 during each stroke of the valve door 102. FIG. 5 only shows three curves of the position-dependent sensing signals, but the present invention is not limited hereto. In FIG. 5, taking a valve with a rotational valve door for example, for each curve of the position-dependent sensing signals ST, the torsion of the spindle has the greatest value when the rotational angle $\Phi$ is zero degree, i.e., the valve door is closing while has the smallest value when the rotational angle $\Phi$ ranges between 30 to 60 degrees. Additionally, in the comparison of each curve of the position-dependent sensing signals ST, the torsion of the spindle 103 gradually increases with the stroke counts of the valve door 102. In FIG. 5, the curves 301, 302, and 303 respectively represent linking lines of the position-dependent sensing signals ST of the torsion of the spindle corresponding to the stroke counts being 2000, 4000, and 6000. These curves also reflect failure causing reasons of the valve 10. For example, the curve 302 reflects the situation where the valve seat is stuck while the curve 303 reflects the situation where the valve seat wears. In this case, the storage unit 1061 as shown in FIG. 2 is used to receive and store in real time the position-dependent sensing signals ST of the spindle 103, and the computation unit 1062 as shown in FIG.

2 is used to determine in real time whether magnitude of the stored position-dependent sensing signals ST of the torsion of the spindle 103 exceed a setting torsion limit $T_{th}$ of the spindle 103. Not exceeding the setting torsion limit $T_{th}$ means the spindle is still in a usable state and the valve 10 may control the pressure regulating device 1044 to properly increase the inlet pressure of the actuator 104 by means of the control unit 1064 in order to keep continuous rotation of the spindle 103 and smooth operation of the valve door 102. If exceeding the setting torsion limit $T_{th}$ happens, then the informing unit 1063 may output or transmit failure causing reasons of the valve 10 obtained from the determination of the computation unit 1062, including that the valve seat is stuck or that the valve seat wears, to the remote control-center or the operator.

As shown in FIGS. 1, 2 and 4, in one embodiment, the computation unit 1062 may also separately or simultaneously compute out in real time a second trendline 202 of the last plurality of time-dependent sensing signals SA2 of the second operation parameter stored in the storage unit 1061. Furthermore, the computation unit 1062 may also separately or simultaneously compute out a second accumulated-time threshold $t_{L2}$ of the valve 10 corresponding to a threshold $B_{max}$ of the second operation parameter A2 over the second trendline 202. Still furthermore, the computation unit 1062 may also separately or simultaneously compute out in real time whether the magnitude of the time-dependent sensing signals SA2 of the second operation parameter stored in the storage unit 1061 exceeds a setting limit $B_{th}$ which is smaller than the threshold $B_{max}$ of the second operation parameter A2. In addition, the computation unit 1062 may also separately or simultaneously compute out a second accumulated-time target value $t_{G2}$ of the valve 10 corresponding to the setting limit $B_{th}$ over the second trendline 202, and the informing unit 1063 may also output or transmit the second accumulated-time target value $t_{G2}$ to the remote control-center or operator of the valve 10. In this way, the operation of the valve 10 can be monitored in real time and the disordered valve can be early replaced. On the other hand, when the stroke travel time of the valve door 102 increases but is less than a setting value (for example, 30% of the normal stroke travel time), the valve 10 may control the pressure regulating device 1044 to properly increase the inlet pressure of the actuator 104 by means of the control unit 1064 in order to keep smooth operation of the valve door 102. When the stroke travel time of the valve door 102 is greater than the setting value, the spindle 103 may be about to fail, and the valve 10 may control the pressure regulating device 1044 to properly reduce the inlet pressure of the actuator 104 by means of the control unit 1064 in order to protect the spindle 103 from being damaged.

Figure 6:
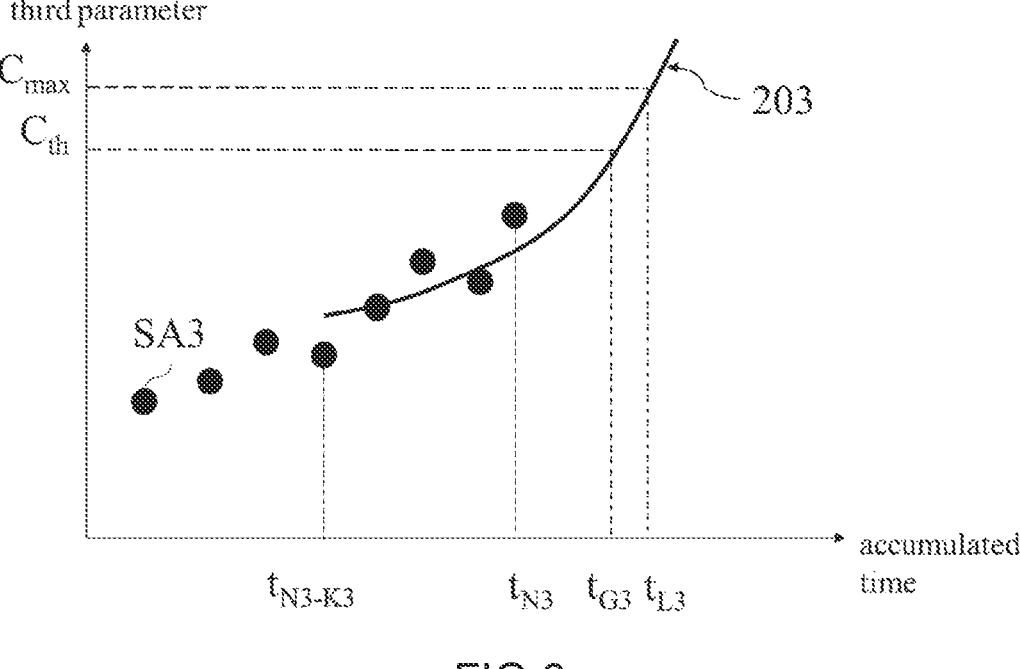
FIG. 6 is a diagram schematically illustrating the relationship between the time-dependent sensing signals of a third operation parameter of the body of the valve varying with time during each stroke from opening to closing of the valve door, the third trendline, and the threshold of the third operation parameter according to one embodiment of the present invention.

As shown in FIGS. 1, 2 and 6, in one embodiment, the first sensor assembly 107 may have a sensor mounted on body 101 to output time-dependent sensing signals SA3 of at least one third operation parameter A3 of or in relevant to the body 101 during each stroke of the valve door 102. When the failure of the valve 10 is associated with the fluid leakage inside the body 101, the so-called third operation parameter A3 may include internal fluid leakage inside the body 101 in each stroke of the valve door 102, and the first sensor assembly 107 may include a flowmeter. In this embodiment, the storage unit 1061 is used to receive and store in real time the time-dependent sensing signals SA3 of the third operation parameter A3. The computation unit 1062 is used to compute out in real time a third trendline 203 (see FIG. 6) of the last plurality of the stored time-dependent sensing signals SA3 of the third operation parameter A3. In FIG. 6, the last plurality of the stored time-dependent sensing signals SA3 of the third operation parameter A3 means the time-dependent sensing signals SA3 taken during a time period from $t_{N3-K3}$ to $t_{N3}$, wherein the time-dependent sensing signal SA3 taken at the accumulated-time $t_{N3}$ is the last signal SA3 that has been stored in the storage unit 1061 while the time-dependent sensing signal SA3 taken at the accumulated-time $t_{N3-K3}$ is the K3-th signal counted from the last signal SA3, N3 and K3 are integers and K3 is smaller than N3. In one embodiment, N3 is equal to or greater than 30 and K3 is equal to or greater than one. Additionally, the computation unit 1062 may also separately or simultaneously compute out in real time a third accumulated-time threshold $t_{L3}$ of the valve 10 corresponding to a threshold $C_{max}$ of the third operation parameter A3 over the third trendline 203. The informing unit 1063 may also output or transmit the third accumulated-time threshold $t_{L3}$ to the remote of the valve 10, such as a remote control-center or a remote operator of the valve 10. In addition, the computation unit 1062 may also separately or simultaneously compute out a third accumulated-time target value $t_{G3}$ of the valve 10 corresponding to the setting limit $C_{th}$, which is smaller than the threshold $C_{max}$, over the third trendline 203, and the informing unit 1063 may also output or transmit the third accumulated time-target value $t_{G3}$ to the remote control-center or operator of the valve 10. The third accumulated time-target value $t_{G3}$ may be represented by accumulated stroke counts, for example 50000 counts of the valve door 102. In one embodiment, the controller 106 may first determine whether the accumulated time or counts of the current stroke of the valve door reaches the third accumulated-time target value $t_{G3}$; if not, the informing unit 1063 may output or transmit a variance between the accumulated time or counts of the current stroke of the valve door and the third accumulated-time target value $t_{G3}$ to the remote of the valve 10; if yes, the informing unit 1063 may output or transmit a variance between the accumulated time or counts of the current stroke of the valve door and the third accumulated-time threshold $t_{L3}$ to the remote of the valve 10. In addition, the computation unit 1062 may also separately or simultaneously determine whether the magnitude of the time-dependent sensing signals SA3 of the third operation parameter stored in the storage unit 1061 exceeds the setting limit $C_{th}$ of the third operation parameter A3.

Figure 7:
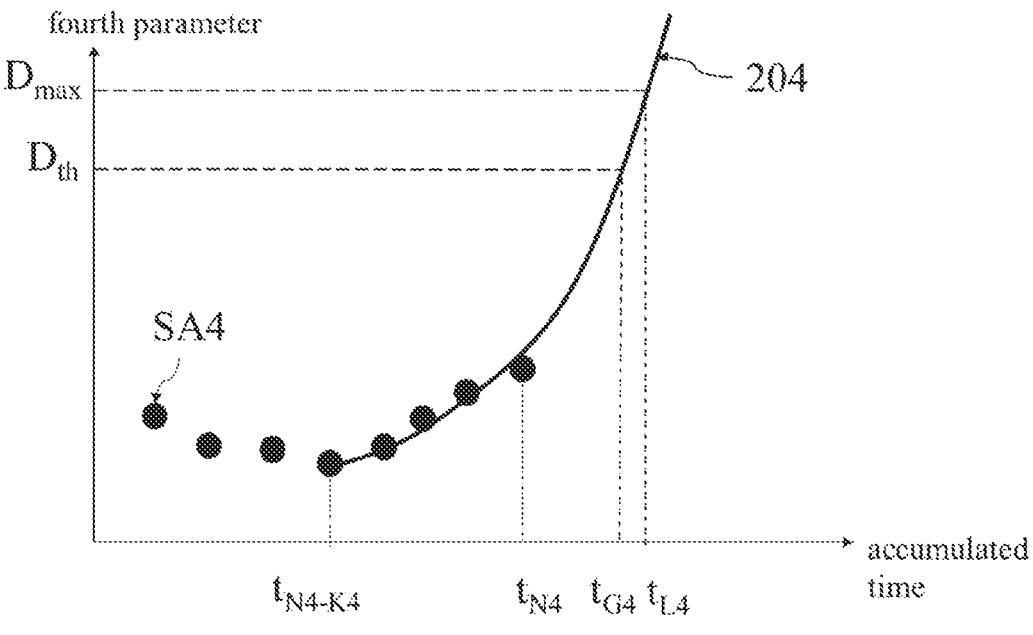
FIG. 7 is a diagram schematically illustrating the relationship between the time-dependent sensing signals of a fourth operation parameter of a pipeline connecting with the body of the valve varying with time during each stroke from opening to closing of the valve door, the fourth trendline, and the threshold of the fourth operation parameter according to one embodiment of the present invention.

As shown in FIGS. 1, 2 and 7, in one embodiment, the first sensor assembly 107 may also have a sensor mounted on the pipeline 109 to output time-dependent sensing signals SA4 of at least one fourth operation parameter A4 of or in relevant to the pipeline 109 during each stroke of the valve door 102. When the failure of the valve 10 is associated with the fluid pressure inside the pipeline 109, the so-called fourth operation parameter A4 may include closing pressure at the connection 1091 of the pipeline 109 with the body 101 in each stroke of the valve door 102 while the chamber is closing, and the first sensor assembly 107 may include a fluid pressure sensor. The "closing pressure" means the pressure performance of the fluid inside the pipeline 109 when the valve door 102 closes the hollow chamber 1011. In this embodiment, the storage unit 1061 is used to receive and store in real time the time-dependent sensing signals SA4 of the fourth operation parameter A4. The computation unit 1062 is used to compute out in real time a fourth trendline 204 (see FIG. 7) of the last plurality of the stored time-dependent sensing signals SA4 of the fourth operation parameter A4. As shown in FIG. 7, the last plurality of the stored time-dependent sensing signals SA4 of the fourth operation parameter A4 means the time-dependent sensing signals SA4 taken during a time period from $t_{N4-K4}$ to $t_{N4}$, wherein the time-dependent sensing signal SA4 taken at the accumulated-time $t_{N4}$ is the last signal SA4 that has been stored in the storage unit 1061 while the time-dependent sensing signal SA4 taken at the accumulated-time $t_{N4-K4}$ is the K4-th signal counted from the last signal SA4, N4 and K4 are integers and K4 is smaller than N4. In one embodiment, N4 is equal to or greater than 30 and K4 is equal to or greater than one. Additionally, the computation unit 1062 may also separately or simultaneously compute out in real time a fourth accumulated-time threshold $t_{L4}$ of the valve 10 corresponding to a threshold $D_{max}$ of the fourth operation parameter A4 over the fourth trendline 204. The informing unit 1063 may also output or transmit the fourth accumulated-time threshold $t_{L4}$ to the remote of the valve 10, such as a remote control-center or a remote operator of the valve 10. In addition, the computation unit 1062 may also separately or simultaneously compute out a fourth time-target value $t_{G4}$ of the valve 10 corresponding to the setting limit an of the fourth operation parameter, which is smaller than the threshold $D_{max}$, over the fourth trendline 204, and the informing unit 1063 may also output or transmit the fourth accumulated-time target value $t_{G4}$ to the remote control-center or operator of the valve 10. The fourth accumulated-time target value $t_{G4}$ may be represented by accumulated stroke counts, for example 50000 counts of the valve door 102. In one embodiment, the controller 106 may first determine whether the accumulated time or counts of the current stroke of the valve door 102 reaches the fourth accumulated-time-target value $t_{G4}$; if not, the informing unit 1063 may transmit a variance between the accumulated time or counts of the current stroke of the valve door and the fourth accumulated-time target value $t_{G4}$ to the remote of the valve 10; if yes, the informing unit 1063 may output or transmit a variance between the accumulated time or counts of the current stroke of the valve door and the fourth accumulated-time threshold $t_{L4}$ to the remote of the valve 10. In addition, the computation unit 1062 may also separately or simultaneously determine whether the magnitude of the time-dependent sensing signals SA4 of the fourth operation parameter stored in the storage unit 1061 exceeds the setting limit MI of the fourth operation parameter A4.

Figure 8:
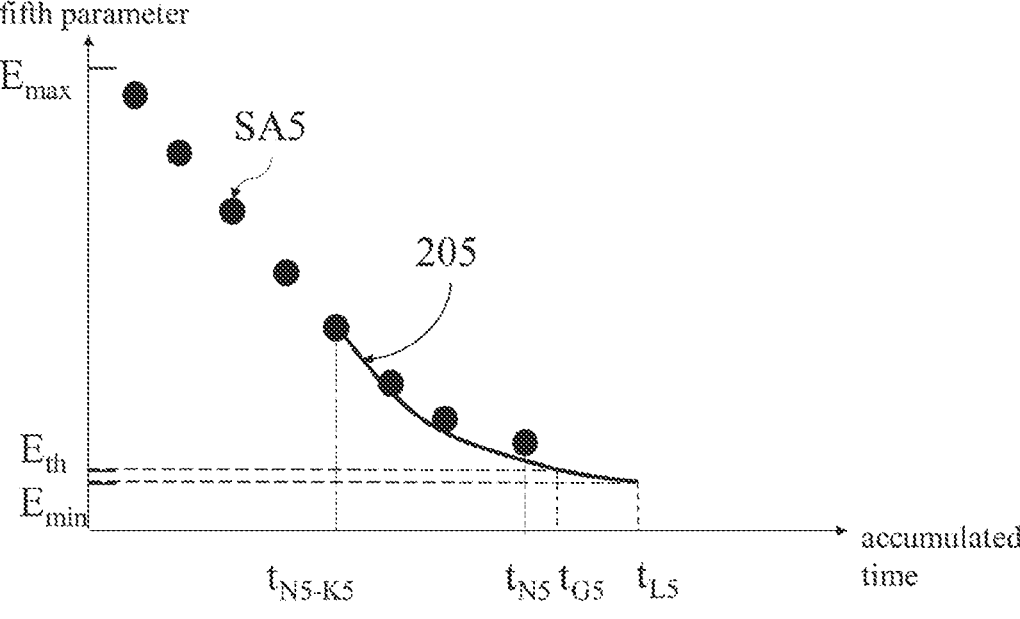
FIG. 8 is a diagram schematically illustrating the relationship between the time-dependent sensing signals of a fifth operation parameter of the actuator varying with time during each stroke from opening to closing of the valve door, the fifth trendline, and the threshold of the fifth operation parameter according to one embodiment of the present invention.

As shown in FIGS. 1, 2 and 8, in one embodiment, the valve 10 disclosed in the present invention may further include a second sensor assembly 108. The second sensor assembly 108 may have a sensor mounted on the actuator 104 and is electrically connected or in telecommunication with the controller 106 to output time-dependent sensing signals SA5 of at least one fifth operation parameter A5 of the actuator 104 during each stroke of the valve door 102. The actuator may be pneumatic or electrical or hydraulic type. When the valve 10 does not actually fail but the actuator fails, the result also results in the failure of the valve. The so-called fifth operation parameter A5 may include the torsion and the working air pressure of the actuator 104, and the second sensor assembly 108 may include a torsion sensor, a stress sensor, a strain sensor, or a pressure sensor. In this embodiment, the storage unit 1061 is used to receive and store in real time the time-dependent sensing signals SA5 of the fifth operation parameter A5. The computation unit 1062 is used to compute out in real time a fifth trendline 205 (see FIG. 8) of the last plurality of the stored time-dependent sensing signals SA5 of the fifth operation parameter A5. As shown in FIG. 8, the last plurality of the stored time-dependent sensing signals SA5 of the fifth operation parameter A5 means the time-dependent sensing signals SA5 taken during a time period from $t_{N5-K5}$ to $t_{N5}$, wherein the time-dependent sensing signal SA5 taken at the accumulated-time $t_{N5}$ is the last signal SA5 that has been stored in the storage unit 1061 while the time-dependent sensing signal SA5 taken at the accumulated-time $t_{N5}$-K5 is the K5-th signal counted from the last signal SA5, N5 and K5 are integers and K5 is smaller than N5. In one embodiment, N5 is equal to or greater than 30 and K5 is equal to or greater than one. Additionally, the computation unit 1062 may also separately or simultaneously compute out in real time a fifth accumulated-time threshold $t_{L5}$ of the valve 10 corresponding to a threshold $E_{max}$ of the fifth operation parameter A5 over the fifth trendline 205. The informing unit 1063 may also output or transmit the fifth accumulated-time threshold $t_{L5}$ to the remote of the valve 10, such as a remote control-center or a remote operator of the valve 10. In addition, the computation unit 1062 may also separately or simultaneously compute out a fifth accumulated-time target value $t_{G5}$ of the valve 10 corresponding to the setting limit $E_{th}$ of the fifth operation parameter, which is greater than the minimum threshold $E_{min}$ of the fifth operation parameter, over the fifth trendline 205, and the informing unit 1063 may also output or transmit the fifth accumulated-time target value $t_{G5}$ to the remote control-center or operator of the valve 10. The fifth accumulated-time target value $t_{G5}$ may be represented by accumulated time or counts of the power output shaft of the actuator 104. In one embodiment, the controller 106 may first determine whether the accumulated time or counts of the power output shaft of the actuator 104 reaches the fifth accumulated-time target value $t_{G5}$; if not, the informing unit 1063 may output or transmit a variance between the accumulated time or counts of the power output shaft of the actuator 104 and the fifth accumulated-time target value $t_{G5}$ to the remote of the valve 10 to remind the remote control-center or operator of the coming of the fifth accumulated-time target value $t_{G5}$; if yes, the informing unit 1063 may output or transmit a variance between the accumulated time or counts of the power output shaft of the actuator 104 and the fifth accumulated-time threshold $t_{L5}$ to the remote of the valve 10 to remind the remote control-center or operator of the coming of the fifth accumulated-time threshold $t_{L5}$. In addition, the computation unit 1062 may also separately or simultaneously determine whether the magnitude of the time-dependent sensing signals SA5 of the fifth operation parameter stored in the storage unit 1061 is below the setting limit $E_{th}$ of the fifth operation parameter A5.

Figure 9:
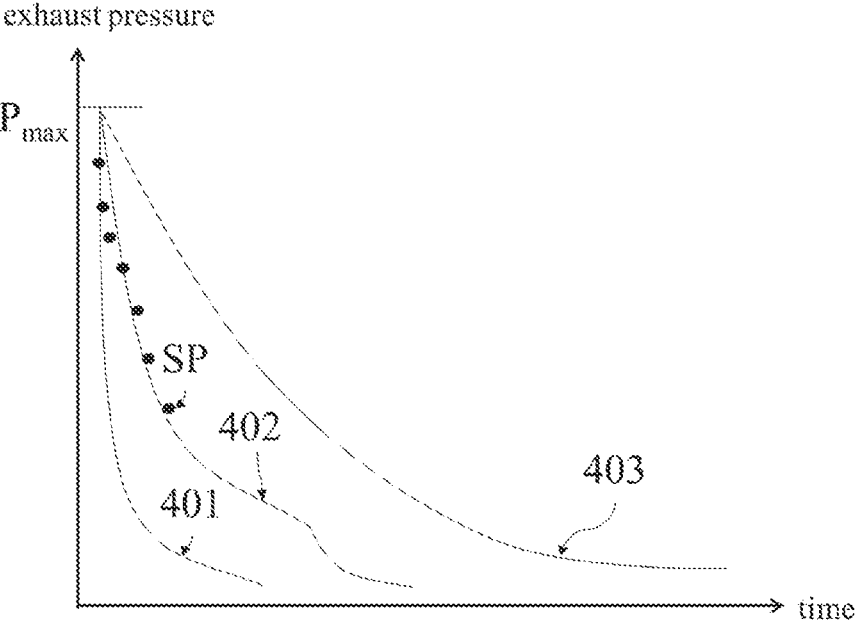
FIG. 9 is a diagram schematically illustrating the time-dependent sensing signals of an exhaust pressure of the actuator varying with time according to one embodiment of the present invention.

In one embodiment, as shown in FIG. 9, when the actuator 104 is pneumatic, the fifth operation parameter A5 of the actuator 104 may be the working air pressure and the signal detected by the second sensor assembly 108 may be the sensing signals SP of the exhaust pressure of the actuator 104. The maximum threshold of the exhaust pressure is $P_{max}$. At this time, the storage unit 1061 may be used to receive and store in real time the sensing signal SP of the exhaust pressure, and the computation unit 1062 may also separately or simultaneously determine in real time whether the change of the exhaust pressure P is normal. As shown in FIG. 9, the exhaust pressure of the actuator 104 decreases as the stroke travel time of the valve door 102 increases, and the curves 401 to 403 respectively represent the actuator's normal performance, poor exhaust performance, and leakage occurrence performance. Therefore, in this embodiment, the controller 106 may have ability to determine whether the exhaust pressure of the actuator 104 falls on the normal performance curve 401 according to the sensing signals SP of the exhaust pressure detected by the second sensor assembly 108. If not, the controller 106 may further determine the relationship between the exhaust pressure and the curve 402 or 403 and obtain the reasons causing future failures of the actuator 104, such as poor exhaust or leakage (for example, caused by the damage of the piston seal ring), and the informing unit 1062 may be used to output or transmit these reasons to the remote of the valve 10, such as a remote control-center or an operator (not shown), so that the damaged parts of the actuator 104 can be repaired or the entire actuator 104 can be replaced at earlier stage to avoid that the failure of the actuator 104 causes the operation failure of the valve 10.

In the foregoing embodiments, the first operation parameter A1, the second operation parameter A2, the third operation parameter A3, the fourth operation parameter A4, and the fifth operation parameter A5 are respectively of or in relevant to the spindle 103, valve door 102, body 101, pipeline 109, and actuator 104 of the valve 10. Since the spindle 103 and the valve door 102 are the most important components related to the operation of the valve 10, the first operation parameter A1 and the second operation parameter A2 are more important than other operation parameters in predicting a time threshold of the operation of the valve with capability to self-anticipate failure. However, this does not mean that other operation parameters of or in relevant to other components have no role in predicting the accumulated-time threshold of the valve. In addition, the first accumulated-time threshold $t_{L1}$, the second accumulated-time threshold $t_{L2}$, the third accumulated-time threshold $t_{L3}$, the fourth accumulated-time threshold $t_{L4}$, and the fifth accumulated-time threshold $t_{L5}$ obtained respectively according to the first operation parameter A1, the second operation parameter A2, the third operation parameter A3, the fourth operation parameter A4, and the fifth operation parameter A5 may be different from each other. The remote control-center and the operator far away from the valve 10 may separately use these accumulated-time thresholds or comprehensively compare these accumulated-time thresholds to decide subsequent replacement or repairing of the valve, or the controller 106 may directly compare these accumulated-time thresholds and output or transmit the smallest accumulated-time threshold to the remote control-center and operator according to a larger safety factor consideration.

Figure 10:
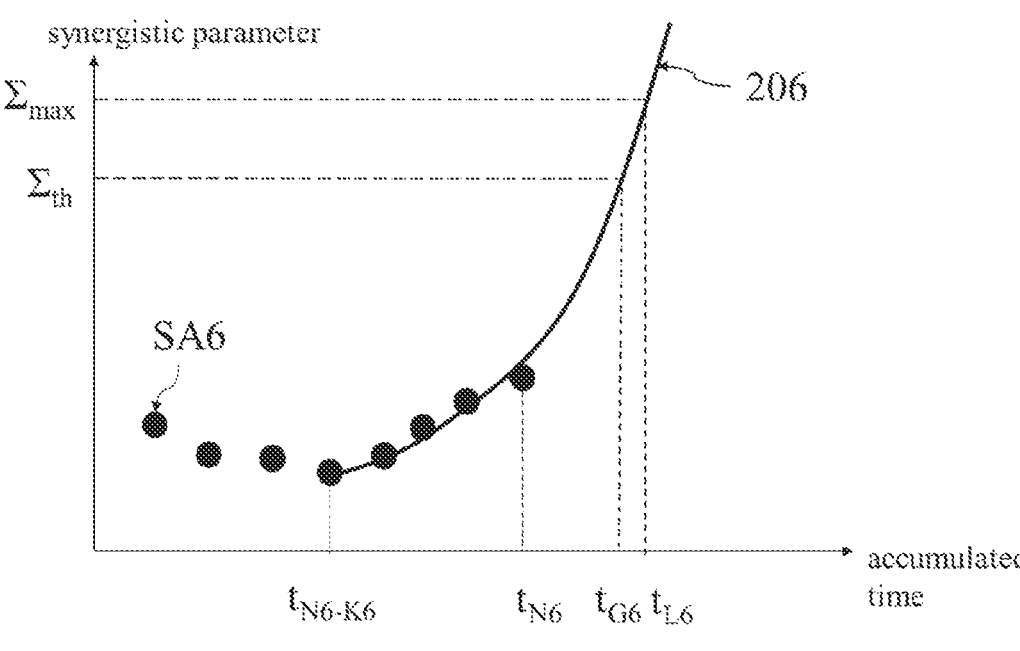
FIG. 10 is a diagram schematically illustrating the relationship between the computed time-dependent values of a synergistic operation parameter of the valve varying with time during each stroke from opening to closing of the valve door, the synergistic trendline, and the threshold of the synergistic operation parameter according to one embodiment of the present invention.

In other embodiments, as shown in FIG. 10, any two or more of the first operation parameter A1, the second operation parameter A2, the third operation parameter A3, the fourth operation parameter A4, and the fifth operation parameter A5 may be respectively multiplied with corresponding weighting values to be a sum which can be regarded as a synergistic operation parameter A6 of the valve 10. The synergistic operation parameter A6 is an operation parameter corresponding to the combined effect of any two or more of the first operation parameter A1, the second operation parameter A2, the third operation parameter A3, the fourth operation parameter A4, and the fifth operation parameter A5. The corresponding weighting values of the first operation parameter A1, the second operation parameter A2, the third operation parameter A3, the fourth operation parameter A4, and the fifth operation parameter A5 are obtained based on the importance ranking of each operation parameter in the operation of the valve and may be measured from experiments and according to the rule of thumb. In addition, the computation unit 1062 may compute out in real time a synergistic trendline 206 of the last plurality of time-dependent computed values SA6 of the synergistic operation parameter. The time-dependent computed values SA6 of the synergistic operation parameter are not obtained by sensing but by the abovementioned weighting computation of the time-dependent sensing signals SA1, SA2, SA3, SA4, and SA5 of the first operation parameter A1, the second operation parameter A2, the third operation parameter A3, the fourth operation parameter A4, and the fifth operation parameter A5 through the computation unit 1062. Therefore, the storage unit 1061 may be further used to store in real time the time-dependent computed values SA6 of the synergistic operation parameter. As shown in FIG. 10, the so-called last plurality of computed values SA6 of the synergistic operation parameter over time means the computed values SA6 during the period from time $t_{N6-K6}$ to time $t_{N6}$. The time-dependent computed value SA6 at the accumulated-time $t_{N6}$ is the last time-dependent computed value SA6 of the synergistic operation parameter stored in the storage unit 1061, while the time-dependent computed value SA6 at the accumulated-time $t_{N6}$-K6 is the K6-th time-dependent computed value SA6 counted from the last value SA6. Both N6 and K6 are integers, and K6 is less than N6. In one embodiment, N6 is equal to or greater than 30 and K6 is equal to or greater than 1. In addition, the computation unit 1062 may also separately or simultaneously compute out a synergistic accumulated-time threshold $t_{L6}$ of the valve 10 corresponding to a threshold/max of the synergistic operation parameter A6 over the synergistic trendline 206, and the informing unit 1063 may also output or transmit the synergistic accumulated-time threshold $t_{L6}$ to the remote of the valve 10. In addition, the computation unit 1062 may also separately or simultaneously compute out a synergistic accumulated-time target value $t_{G6}$ of the valve 10 corresponding to a setting limit $\Sigma_{th}$, of the synergistic operation parameter, which is smaller than the threshold $\Sigma_{max}$ of the synergistic operation parameter, over the synergistic trendline 206, and the informing unit 1063 may also output or transmit the synergistic accumulated-time target value $t_{G6}$ to the remote control-center or operator of the valve 10. The synergistic accumulated-time target value $t_{G6}$ may be represented by accumulated stroke travel time or stroke counts of the valve door 102. In one embodiment, the controller 106 may first determine whether the accumulated stroke travel time or stroke counts of the valve door 102 reaches the synergistic accumulated-time target value $t_{G6}$; if not, the informing unit 1063 may output or transmit a variance between the accumulated stroke travel time or stroke counts of the valve door 102 and the synergistic accumulated-time target value $t_{G6}$ to the remote of the valve 10 to remind the remote control-center or operator of the coming of the synergistic accumulated-time target value $t_{G6}$; if yes, the informing unit 1063 may output or transmit a variance between the accumulated stroke travel time or stroke counts of the valve door 102 and the synergistic accumulated-time threshold $t_{L6}$ to the remote of the valve 10 to remind the remote control-center or operator of the coming of the synergistic accumulated-time threshold $t_{L6}$. Compared with the accumulated-time threshold and accumulated-time target value obtained from a single operation parameter, the synergistic accumulated-time threshold $t_{L6}$ and synergistic accumulated-time target value $t_{G6}$ are obtained from the synergistic operation parameter including the combined effect of any two or more of the operation parameters and may give the valve with capability to self-anticipate failure better performance in the lifetime prediction. In other embodiments, the computation unit 1062 may also separately or simultaneously determine whether the magnitude of the time-dependent computed values SA6 of the synergistic operation parameter stored in the storage unit 1061 exceeds the setting limit $\Sigma_{th}$ of the synergistic operation parameter A6.

Figure 11:
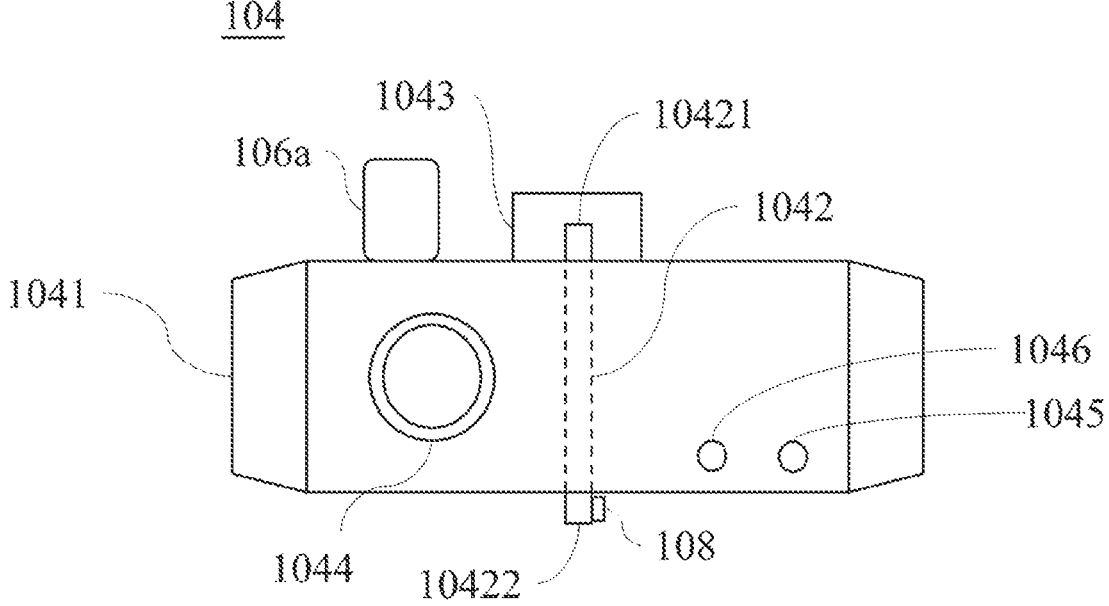
FIG. 11 is a plane view schematically illustrating an actuator with capability to self-anticipate failure according to one embodiment of the present invention.

Referring to FIG. 11, in the abovementioned embodiments, the actuator 104 may be pneumatic, hydraulic, or electrical. The actuator 104 may include an actuator body 1041, a power output shaft 1042, and a position indicator 1043. The actuator body 1041 may be provided inside it with a mechanism to transform air pressure, fluid pressure, or electrical energy into mechanical energy. The power output shaft 1042 penetrates the actuator body 1041 and utilizes the mechanical energy to rotate. One end 10421 of the power output shaft 1042 is connected with the position indicator 1043 so that the position indicator 1043 rotates with the power output shaft 1042 and can be used to read the rotation position of the power output shaft 1042 during the operation of the actuator 104. The other end 10422 of the power output shaft 1042 may be a male connector or a female connector for receiving a rotatable shaft of a device, such as the spindle 103 of the valve 10, to be driven by the actuator 104. In addition, the actuator may have a controller 106a the same as the controller 106, which means the controller 106a has the same storage unit 1061, the same computation unit 1062, the same informing unit 1063, and the same control unit 1064. The controller 106a is electrically connected or in telecommunication with the second sensor assembly 108. The sensor assembly 108 may have one sensor or a plurality of sensors mounted on the actuator body 1041 or the power output shaft 1042, such as piezoelectric sensors, torsion sensors, stress sensors, strain sensors, or pressure sensors. Theses sensors are also electrically connected or in telecommunication with the controller 106a. In one embodiment, the sensor assembly 108 includes a torsion sensor mounted near the end 10421 or the other end 10422 of the power output shaft 1042 to sense the torsion of the power output shaft 1042. Preferably, the torsion sensor is mounted on the other end 10422 which is used to connect a rotatable shaft of a device to be driven. As shown in FIG. 11, when the actuator 104 is pneumatic, the sensor assembly 108 may include sensors mounted near the air inlet port 1045 or the air exhaust port 1046 of the actuator to sense the inlet pressure or the exhaust pressure (may be called output pressure) of the actuator 104. The working air pressure inside the actuator 104 is modulated by regulating the inlet pressure and the exhaust pressure. When the actuator 104 is pneumatic, the actuator 104 may further include a pressure regulating device 1044. The pressure regulating device 1044 may be a combination of bolts and nuts. The pressure regulating device 1044 may be connected with the mechanism inside the actuator body 1041 to regulate the inlet pressure of the actuator 104. The so-called working air pressure is the air pressure of the pneumatic actuator during the operation and is associated with the inlet pressure and the exhaust pressure. In other embodiments, the motion type of the power output shaft 1042 of the actuator 104 may be linear and is not limited herein.

Referring to FIG. 8, when the second sensor assembly 108 is electrically connected or in telecommunication with the controller 106a, the behaviors of the controller 106a and the second sensor assembly 108 are the same as that of the controller 106 and the second sensor assembly 108. The difference is that the "accumulated time" in the horizontal axis is of the actuator 104 rather than of the valve 10. In this case, the informing unit 1063 included in the controller 106a may output or transmit the fifth accumulated-time threshold $t_{L5}$ or the fifth accumulated-time target value $t_{G5}$ to the remote of the actuator 104 rather than the remote of the valve 10. In other words, the controller 106a plays a role of monitoring the operation of the actuator 104. The controller 106a may first determine whether the accumulated time or counts of the power output shaft 1042 of the actuator 104 reaches the fifth accumulated-time target value $t_{G5}$; if not, the informing unit 1063 of the controller 106a may transmit a variance between the accumulated time or counts of the power output shaft 1042 of the actuator 104 and the fifth accumulated-time target value $t_{G5}$ to the remote of the actuator 104 to remind the remote control-center or operator of the coming of the fifth accumulated-time-target value $t_{G5}$; if yes, the informing unit 1063 of the controller 106a may output or transmit a variance between the accumulated time or counts of the power output shaft 1042 of the actuator 104 and the fifth accumulated-time threshold $t_{L5}$ to the remote of the actuator 104 to remind the remote control-center or operator of the coming of the fifth accumulated-time threshold $t_{L5}$. In addition, the computation unit 1062 may also separately or simultaneously determine whether the magnitude of the time-dependent sensing signals SA5 of the fifth operation parameter stored in the storage unit 1061 of the controller 106a is below the setting limit $E_{th}$ of the fifth operation parameter A5. The fifth accumulated-time threshold $t_{L5}$ or the fifth accumulated-time target value $t_{G5}$ may be represented by the accumulated counts, for example 5000 counts, or the accumulated time, for example 10000 hours of the rotation of the power output shaft 1042.

Similarly, the storage unit 1061 of the controller 106a is further used to store in real time a variance $|SA5-E_{min}|$ between the time-dependent sensing signal SA5 of the fifth operation parameter A5 and the threshold $E_{min}$ of the fifth operation parameter A5, and the control unit 1064 of the controller 106a is used to regulate in real time the inlet pressure of the actuator 104 according to the variance by means of the pressure regulating device 1044. For example, when these variances start to below a setting limit, it may be that the loading of the power output shaft 1042 increases to a upper limit and further operation of the actuator 104 may damage the power output shaft 1042, in this case, the actuator 104 can itself reduce the inlet pressure of the actuator 104 by means of the control unit 1064 of the controller 106a and the pressure regulating device 1044 to avoid the power input shaft 1042 from being damaged.

In one embodiment, the fifth operation parameter A5 may be the torsion of the power output shaft 1042, the maximum threshold $E_{max}$ of the fifth operation parameter A5 may be a maximum output torque $T_{max}$ of the actuator 104, and the minimum threshold $E_{min}$ of the fifth operation parameter A5 may be a minimum output torque $T_{min}$ of the actuator 104. In this case, the computation unit 1062 of the controller 106a may be used to determine in real time whether magnitude of the time-sensing signals, stored in the storage unit 1061 of the controller 106a, of the torsion of the power output shaft 1042 below a setting torsion limit $\tau_{th}$ that is greater than the minimum output torque $T_{min}$ of the actuator 104. When the torsion of the power output shaft 1042 of the actuator is greater than the setting torsion limit $\tau_{th}$, the power output shaft 1042 is still in a usable state. In this case, the actuator 104 may control the pressure regulating device 1044 to properly increase the inlet pressure of the actuator 104 by means of the control unit 1064 to increase the torsion of the power output shaft 1042 in order to keep continuous rotation of the power output shaft 1042 and smooth operation of the actuator 104. When the torsion of the power output shaft 1042 of the actuator is smaller than the setting torsion limit $\tau_{th}$ but greater than the minimum output torque $T_{min}$ of the actuator 104, further operation of the actuator 104 may damage the power output shaft 1042. In this case, the actuator 104 in pneumatic type can itself reduce the inlet pressure of the actuator 104 by means of the control unit 1064 of the controller 106*a* and the pressure regulating device 1044 to avoid the power input shaft 1042 from being damaged.

Figure 12:
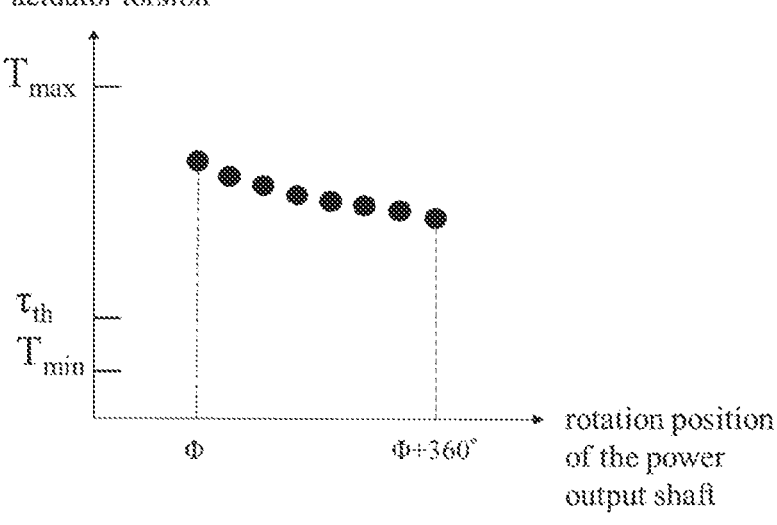
FIG. 12 is a diagram schematically illustrating one group of position-dependent sensing signals of the torsion of the actuator varying with the rotation position of the power output shaft of the actuator according to one embodiment of the present invention.

FIG. 12 is a diagram schematically illustrating one group of position-dependent sensing signals of the torsion of the actuator varying with the rotation position of the power output shaft of the actuator according to one embodiment of the present invention. As shown in FIG. 12, in one embodiment, the second sensor assembly 108 may include a position sensor used to output sensing signals of respective rotation positions of the power output shaft 1042, such as the sensing signals of the rotation positions ranging from angle Φ to angle Φ+360°. In this way, the torsion sensor included in the sensor assembly 108 may output position-dependent sensing signals of the torsion of the power output shaft 1042 which vary with the rotation position of the power output shaft 1042 during the operation of the actuator 104. The storage unit 1061 of the operator 106*a* may store in real time these position-dependent sensing signals of the torsion of the power output shaft 1042, and the computation unit 1062 of the controller 106*a* may determine in real time whether magnitude of the stored position-dependent sensing signals of the torsion of the power output shaft 1042 is below the setting torsion limit $\tau_{th}$. The actuator 104 in pneumatic type can itself regulate the inlet pressure of the actuator 104 by means of the control unit 1064 of the controller 106*a* and the pressure regulating device 1044 to adjust the torsion of the power output shaft 1042.

As shown in FIG. 9, when the actuator 104 is pneumatic, the fifth operation parameter A5 of the actuator 104 may be the working air pressure of the actuator 104, and the second sensor assembly 108 may include a sensor to detect the exhaust pressure of the actuator 104 to obtain a plurality of sensing signals SP. The maximum threshold of the exhaust pressure is $P_{max}$. In this case, the storage unit 1061 of the controller 106*a* may receive and store in real time the sensing signals SP of the exhaust pressure, and the computation unit 1062 may separately or simultaneously determine in real time whether an exhaust pressure change is normal. As shown in FIG. 9, the curves 401 to 403 respectively represent the actuator's normal performance, poor exhaust performance, and leakage occurrence performance. Therefore, in this embodiment, the controller 106*a* may have ability to determine whether the exhaust pressure of the actuator 104 falls on the normal performance curve 401 according to the sensing signals SP of the exhaust pressure detected by the second sensor assembly 108. If not, the controller 106*a* may further determine the relationship between the exhaust pressure and the curve 402 or 403 and thereby obtain the reasons causing future failure of the actuator 104, such as poor exhaust or leakage (may be caused by the damage of the piston seal ring), and the informing unit 1063 of the controller 106*a* may output or transmit these reasons to the remote of the actuator 104, such as a remote control-center or an operator (not shown), so that the damaged parts of the actuator 104 can be repaired or the entire actuator 104 can be replaced at earlier stage to avoid the failure of the actuator 104.

In the foregoing embodiments, the first trendline 201, the second trendline 202, the third trendline 203, the fourth trendline 204, the fifth trendline 205, and the synthetic trendline 206 are computed with a polynomial regression by the computation unit 1062 respectively from the last plurality of first operation parameter time-dependent sensing signals SA1, the last plurality of second operation parameter time-dependent sensing signals SA2, the last plurality of third operation parameter time-dependent sensing signals SA3, the last plurality of fourth operation parameter time-dependent sensing signals SA4, the last plurality of fifth operation parameter time-dependent sensing signals SA5, and the last plurality of synergistic operation parameter time-dependent computed values SA6. In FIG. 3, FIG. 4, FIG. 6, FIG. 7, FIG. 8, and FIG. 10, the reason of using the last plurality of theses time-dependent sensing signals SA1, SA2, SA3, SA4, SA5 and the last plurality of the computed value SA6 is that these signals and values best reflect the current operation state of the valve 10 as the stroke travel time of the valve door 102 accumulated. Therefore, the trendlines computed based on these signals and values can more accurately reflect the future failure time of the valve 10. On the other hand, the line types of the first trendline 201, the second trendline 202, the third trendline 203, the fourth trendline 204, the fifth trendline 205, and the synthetic trendline 206 and as shown in FIG. 3, FIG. 4, FIG. 6, FIG. 7, FIG. 8, and FIG. 10 are only examples, the true line types of these trendlines depend on the distribution of the last plurality of time-dependent sensing signals of these operation parameters or the last plurality of time-dependent computed values stored in the storage unit 1061 and depend on the regression model used in the computation of these trendlines. Additionally, the failure self-anticipation reference of the first accumulated-time threshold, the second accumulated-time threshold, the third accumulated-time threshold, the fourth accumulated-time threshold, the fifth accumulated-time threshold, and the synergistic accumulated-time threshold computed by the computation unit 1062 for the valve may improve as the number of the time-dependent sensing signals or time-dependent computed values of these operation parameters stored in the storage unit 1061 increases. In addition, the proposed valve 10 may include other components in addition to the spindle 103, valve door 102, body 101, pipeline 109 and actuator 104, and the operation parameters of or in relevant to these components or a synergistic operation parameter of the operation parameters may be involved in the evaluation of the failure self-anticipation of the valve 10. In any case, it should be considered as within the spirit and scope of the proposed invention as long as the failure self-anticipation of the valve is performed by sensing the associated operation parameters of all components of the valve and further using a controller of the valve to compute out trendlines of the sensed signal and obtain the accumulated-time thresholds based on the trendlines.

To sum up, the proposed valve has the capability to self-anticipate failure and meets the actual control requirements of the entire system including the valve. The proposed solution specifically improves the performance of the existing valve which is not able to accomplish and announce the failure self-anticipation. The proposed valve uses the computation unit in the controller to compute out the predicted time point when the valve will fail after being used for a period of time and notify the operator away from the valve or the remote control-center in advance. As a result, the valve that is about to fail can be replaced earlier to prevent the failure of the valve from affecting the operation of the entire system including the valve.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangement.

What is claimed is:

1. A valve with capability to self-anticipate failure, comprising:

a body formed with a hollow chamber;

a valve door mounted in the hollow chamber to open and close the hollow chamber;

a spindle inserted into the body and connected with the valve door to rotate with the valve door;

an actuator mounted on the body to drive the spindle to rotate;

a first sensor assembly having sensors mounted on the spindle, the valve door, the body, or a pipeline connecting the body to output time-dependent sensing signals of a first operation parameter of the spindle and at least one of a second operation parameter of the valve door, a third operation parameter in relevant to the body, and a fourth operation parameter in relevant to the pipeline during each stroke from opening to closing of the valve door; and a controller disposed near the body and electrically connected with or in telecommunication with the actuator and the first sensor assembly, the controller comprising:

a storage unit used to receive and store the time-dependent sensing signal of the first operation parameter, and at least one of the second, third, and fourth operation parameters, or to receive and store computed time-dependent values of a synergistic operation parameter representing comprehensive effects of the first, second, third, and fourth operation parameters, wherein each of the computed time-dependent values of the synergistic operation parameter is a sum of respective products of the corresponding time-dependent sensing signal of the first, second, third, and fourth operation parameters and a plurality of corresponding weighting values;

a computation unit in electrical connection with the storage unit to compute out a first trendline of the last plurality of the stored time-dependent sensing signals of the first operation parameter, and at least one of a second trendline of the last plurality of the stored time-dependent sensing signals of the second operation parameter, a third trendline of the last plurality of the stored time-dependent sensing signals of the third operation parameter, a fourth trendline of the last plurality of the stored time-dependent sensing signals of the fourth operation parameter, and a synergistic trendline of the last plurality of the stored computed time-dependent values of the synergistic operation parameter, and to compute out a first accumulated-time threshold of the valve corresponding to a threshold of the first operation parameter over the first trendline, and at least one of a second accumulated-time threshold of the valve corresponding to a threshold of the second operation parameter over the second trendline, a third accumulated-time threshold of the valve corresponding to a threshold of the third operation parameter over the third trendline, a fourth accumulated-time threshold of the valve corresponding to a threshold of the fourth operation parameter over the fourth trendline, and a synergistic accumulated-time threshold of the valve corresponding to a threshold of the synergistic operation parameter over the synergistic trendline;

an informing unit in electrical connection with the computation unit to output the first accumulated-time threshold, and at least one of the second accumulated-time threshold, the third accumulated-time threshold, the fourth accumulated-time threshold, and the synergistic accumulated-time threshold; and a control unit in electrical connection with the computation unit to regulate an inlet pressure of the actuator according to a variance between each of the time-dependent sensing signals of the first operation parameter and the threshold of the first operation parameter or between each of the time-dependent sensing signals of the second operation parameter and the threshold of the second operation parameter, and the storage unit is further used to store the variance.

2. The valve of claim 1, wherein the computation unit is further used to compute out a first accumulated-time target value of the valve corresponding to a setting limit of the first operation parameter over the first trendline, a second accumulated-time target value of the valve corresponding to a setting limit of the second operation parameter over the second trendline, a third accumulated-time target value of the valve corresponding to a setting limit of the third operation parameter over the third trendline, a fourth accumulated-time target value of the valve corresponding to a setting limit of the fourth operation parameter over the fourth trendline, or a synergistic accumulated-time target value of the valve corresponding to a setting limit of the synergistic operation parameter over the synergistic trendline; the informing unit is further used to output one of the first accumulated-time target value, the second accumulated-time target value, the third accumulated-time target value, the fourth accumulated-time target value, and the synergistic accumulated-time target value; and the setting limit of the first operation parameter is smaller than the threshold of the first operation parameter, the setting limit of the second operation parameter is smaller than the threshold of the second operation parameter, the setting limit of the third operation parameter is smaller than the threshold of the third operation parameter, the setting limit of the fourth operation parameter is smaller than the threshold of the fourth operation parameter, and the setting limit of the synergistic operation parameter is smaller than the threshold of the synergistic operation parameter.

3. The valve of claim 2, wherein the computation unit is further used to determine whether magnitude of the stored time-dependent sensing signals of the first operation parameter exceed the setting limit of the first operation parameter, whether magnitude of the stored time-dependent sensing signals of the second operation parameter exceed the setting limit of the second operation parameter, whether magnitude of the stored time-dependent sensing signals of the third operation parameter exceed the setting limit of the third operation parameter, whether magnitude of the stored time-dependent sensing signals of the fourth operation parameter exceed the setting limit of the fourth operation parameter, or whether magnitude of the stored computed time-dependent values of the synergistic operation parameter exceed the setting limit of the synergistic operation parameter.

4. The valve of claim 2, wherein the first operation parameter is the torsion of the spindle, and the threshold of the first operation parameter includes a maximum output torque of the actuator.

5. The valve of claim 1, wherein the first operation parameter is the torsion of the spindle, and the threshold of the first operation parameter includes a maximum output torque of the actuator.

6. The valve of claim 5, wherein the first sensor assembly is further used to output position-dependent sensing signals of the torsion of the spindle which vary with the position of the valve door during each stroke from opening to closing of the valve door; the storage unit is further used to receive and store the position-dependent sensing signals of the torsion of the spindle; and the computation unit is further used to determine whether magnitude of the stored position-dependent sensing signals of the torsion of the spindle exceed a setting torsion limit of the spindle.

7. The valve of claim 6, wherein the informing unit is further used to output failure causing reasons of the valve according to the determination of the computation unit.

8. The valve of claim 1, wherein the first operation parameter is the axial stress of the spindle, and the threshold of the first operation parameter includes an allowable stress of the spindle.

9. The valve of claim 8, wherein the computation unit is further used to calibrate the allowable stress of the spindle according to the variation of yield strength of the spindle as the temperature of the spindle changes, and the storage unit is further used to receive and store the yield strength of the spindle that varies with the temperature.

10. The valve of claim 8, wherein the computation unit is further used to determine whether magnitude of the stored time-sensing signals of the axial stress of the spindle exceed a setting stress limit of the spindle that is smaller than the allowable stress of the spindle.

11. The valve of claim 1, further comprising:

a second sensor assembly having sensors mounted on the actuator and being electrically connected or in telecommunication with the controller to output time-dependent sensing signals of a fifth operation parameter of the actuator during each stroke from opening to closing of the valve door;

wherein the storage unit is further used to receive and store the time-dependent sensing signals of the fifth operation parameter; the computation unit is further used to compute out a fifth trendline of the last plurality of the stored time-dependent sensing signals of the fifth operation parameter, and to compute out a fifth accumulated-time threshold of the valve corresponding to a threshold of the fifth operation parameter over the fifth trendline; the fifth operation parameter includes torsion of the actuator or working air pressure of the actuator; and the informing unit is further used to output the fifth accumulated-time threshold.

12. The valve of claim 11, wherein the informing unit is further used to output failure causing reasons of the valve.

13. The valve of claim 1, wherein one of the first accumulated-time threshold, the second accumulated-time threshold, the third accumulated-time threshold, the fourth accumulated-time threshold, and the synergistic accumulated-time threshold is represented by accumulated stroke counts of the valve door.

14. A valve driving actuator with capability to self-anticipate failure, the actuator having an actuator body and a power output shaft penetrating the actuator body, the power output shaft having one end to receive a rotatable spindle of a valve to be driven by the actuator, comprising:

a sensor assembly having at least one sensor mounted on the actuator body or the power output shaft to output time-dependent sensing signals of at least one operation parameter of the actuator; and a controller disposed near the actuator body and electrically connected or in telecommunication with the sensor assembly, the controller comprising:

a storage unit used to receive and store the time-dependent sensing signals of the operation parameter of the actuator;

a computation unit in electrical connection with the storage unit to compute out a trendline of the last plurality of the stored time-dependent sensing signals of the operation parameter, and to compute out an accumulated-time threshold of the actuator corresponding to a threshold of the operation parameter over the trendline; and an informing unit in electrical connection with the computation unit to output the accumulated-time threshold, wherein the operation parameter includes torsion of the power output shaft and a working air pressure of the actuator, and the working air pressure is associated with an inlet pressure and an exhaust pressure of the actuator, and wherein the actuator is a pneumatic actuator, the sensor assembly has a sensor to output sensing signals of the exhaust pressure of the actuator, the computation unit is further used to determine whether a change of the exhaust pressure is normal, and the informing unit is further used to output reasons causing failure of the actuator according to the result of the determination of the computation unit.

15. The valve driving actuator of claim 14, further comprising:

a pressure regulating device connected to the actuator body to regulate the inlet pressure of the actuator.

16. The valve driving actuator of claim 15, wherein the controller further comprises a control unit in electrical connection with the computation unit to regulate the inlet pressure of the actuator according to a variance between each of the time-dependent sensing signals of the operation parameter of the actuator and the threshold of the operation parameter, and the storage unit is further used to store the variance.

\* \* \* \* \*